(12) United States Patent
Turner

(10) Patent No.: US 9,714,511 B2
(45) Date of Patent: Jul. 25, 2017

(54) APPARATUS AND METHOD FOR MANUFACTURING INSULATED WALL PANELS

(75) Inventor: Ray Turner, Edmonton (CA)

(73) Assignee: Lenmak Exterior Innovations Inc., Edmonton (CA)

( * ) Notice: Subject to any disclaimer, the term of this patent is extended or adjusted under 35 U.S.C. 154(b) by 39 days.

(21) Appl. No.: 13/995,836

(22) PCT Filed: Jun. 15, 2012

(86) PCT No.: PCT/CA2012/000585
§ 371 (c)(1),
(2), (4) Date: Jun. 19, 2013

(87) PCT Pub. No.: WO2012/171107
PCT Pub. Date: Dec. 20, 2012

(65) Prior Publication Data
US 2013/0269272 A1    Oct. 17, 2013

Related U.S. Application Data

(60) Provisional application No. 61/498,414, filed on Jun. 17, 2011, provisional application No. 61/511,447, filed on Jul. 25, 2011.

(51) Int. Cl.
*E04C 2/292* (2006.01)
*E04F 13/08* (2006.01)
(Continued)

(52) U.S. Cl.
CPC .............. *E04C 2/292* (2013.01); *B32B 3/04* (2013.01); *B32B 5/18* (2013.01); *B32B 15/095* (2013.01);
(Continued)

(58) Field of Classification Search
CPC ....... B32B 15/04; B32B 15/043; B32B 15/08; B32B 15/095; B32B 27/06; B32B 3/04;
(Continued)

(56) References Cited

U.S. PATENT DOCUMENTS 2,585,082 A * 2/1952 Bollinger, Jr. .................. 52/576
3,246,058 A   4/1966 Voelker
(Continued)

FOREIGN PATENT DOCUMENTS

CA      713251 A        7/1965
DE      27 16 676   * 10/1978 ............. B32B 15/08
(Continued)

OTHER PUBLICATIONS

English Abstract for FR 2803230, published on Jul. 6, 2001.*
(Continued)

*Primary Examiner* — Seyed Masoud Malekzadeh
(74) *Attorney, Agent, or Firm* — Marsh Fischmann & Breyfogle, LLP

(57) ABSTRACT

The present invention relates to an apparatus and method for manufacturing unitary insulated wall panels, wherein the panels form a cavity for receiving expandable foam insulation, and form integral attachment means for attaching the panel to a building wall system. Unitary foam insulated panels having integral attachment means are further provided.

13 Claims, 18 Drawing Sheets

(51) Int. Cl.
*E04F 13/12* (2006.01)
*E04B 2/90* (2006.01)
*B32B 5/18* (2006.01)
*B32B 15/095* (2006.01)
*B32B 3/04* (2006.01)
*E04C 2/40* (2006.01)
*B32B 15/08* (2006.01)
*B32B 15/04* (2006.01)
*B32B 5/20* (2006.01)
*E04C 2/38* (2006.01)
*B32B 3/06* (2006.01)
*E04C 2/284* (2006.01)
*B32B 27/06* (2006.01)

(52) U.S. Cl.
CPC .............. *B32B 27/06* (2013.01); *E04B 2/90* (2013.01); *E04C 2/40* (2013.01); *E04F 13/0875* (2013.01); *E04F 13/12* (2013.01); *B32B 3/06* (2013.01); *B32B 5/20* (2013.01); *B32B 15/04* (2013.01); *B32B 15/043* (2013.01); *B32B 15/08* (2013.01); *B32B 27/065* (2013.01); *B32B 2419/00* (2013.01); *E04C 2/284* (2013.01); *E04C 2/384* (2013.01); *Y10T 29/49629* (2015.01); *Y10T 29/52* (2015.01)

(58) Field of Classification Search
CPC ......... B32B 3/06; B32B 5/18; B32B 2419/00; B32B 2419/02; B32B 2419/04; B32B 2419/06; B32B 5/20; B32B 27/065; E04C 2/40; E04C 2/284; E04C 2/292; E04C 2/384; E04B 2/90; E04F 13/12; E04F 13/0875; Y10T 29/49629
USPC ........ 425/4 R, 817 R, 63, 64, 115, 127, 253, 425/362, 471
See application file for complete search history.

(56) References Cited

U.S. PATENT DOCUMENTS

| | | | | |
|---|---|---|---|---|
| 3,646,180 | A | * | 2/1972 | Winnick .................. 264/45.3 |
| 3,733,232 | A | | 5/1973 | Payne |
| 3,942,926 | A | * | 3/1976 | Bulloch, Jr. ........... A47C 27/04 264/45.5 |
| 3,993,526 | A | * | 11/1976 | Off et al. .................. 156/202 |
| 4,125,138 | A | * | 11/1978 | Dever et al. ............... 141/141 |
| 4,743,485 | A | * | 5/1988 | Ting ......................... 428/109 |
| 5,678,369 | A | * | 10/1997 | Ishikawa et al. ........... 52/309.9 |
| 5,758,463 | A | * | 6/1998 | Mancini, Jr. .............. 52/309.12 |
| 6,096,416 | A | * | 8/2000 | Altenberg ................. 428/317.7 |
| 6,247,281 | B1 | * | 6/2001 | Lin ......................... 52/309.4 |
| 6,455,148 | B1 | * | 9/2002 | Spears et al. ............. 428/319.1 |
| 6,763,589 | B2 | * | 7/2004 | Meilleur ................... 29/897.32 |
| 8,028,483 | B2 | * | 10/2011 | Carolan .................... 52/404.1 |
| 8,087,916 | B2 | * | 1/2012 | Kanie et al. ............... 425/4 R |
| 8,458,907 | B1 | * | 6/2013 | Lowery et al. ............ 29/897.32 |
| 2002/0020061 | A1 | * | 2/2002 | Billings et al. ............ 29/897.32 |
| 2006/0096210 | A1 | * | 5/2006 | Placuzzi ................... 52/406.1 |
| 2008/0271399 | A1 | * | 11/2008 | Carolan .................... 52/404.1 |
| 2010/0307657 | A1 | * | 12/2010 | Diaz et al. ................ 156/40 |
| 2011/0094087 | A1 | * | 4/2011 | Tiirola ..................... 29/530 |
| 2013/0316134 | A1 | * | 11/2013 | Anderson et al. .......... 428/138 |

FOREIGN PATENT DOCUMENTS

| | | | | |
|---|---|---|---|---|
| FR | | 2803230 | * 12/1999 | .............. B21D 5/04 |
| WO | 2005/028179 | A1 | 3/2005 | |

OTHER PUBLICATIONS

International Search Report and Written Opinion pertaining to International Application No. PCT/CA2012/000585, dated: Sep. 4, 2012.

\* cited by examiner

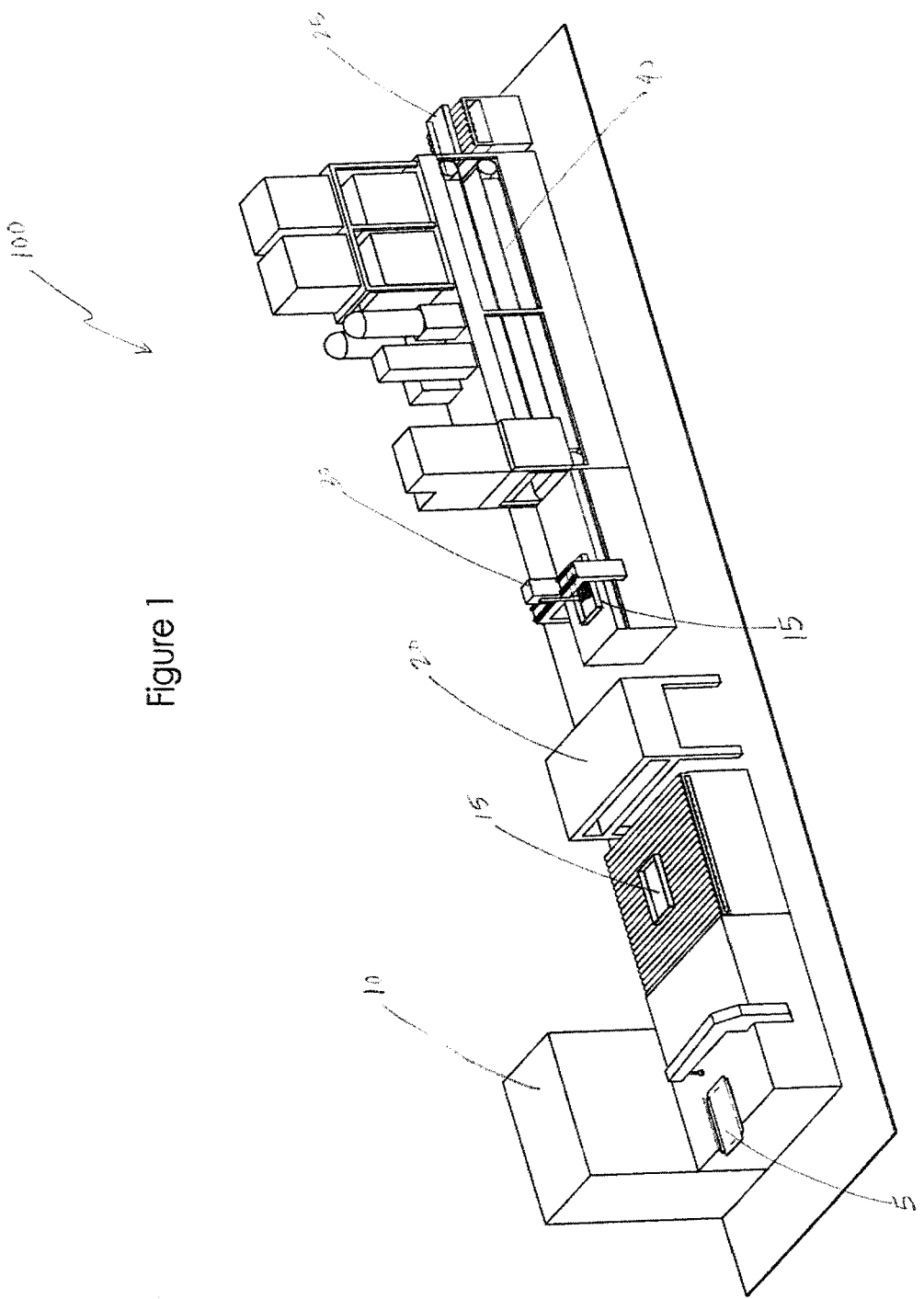

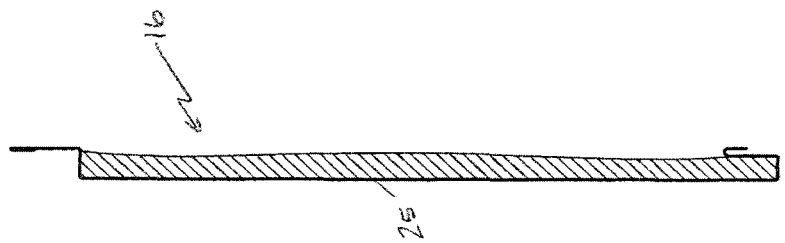
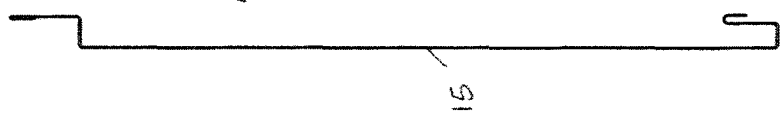
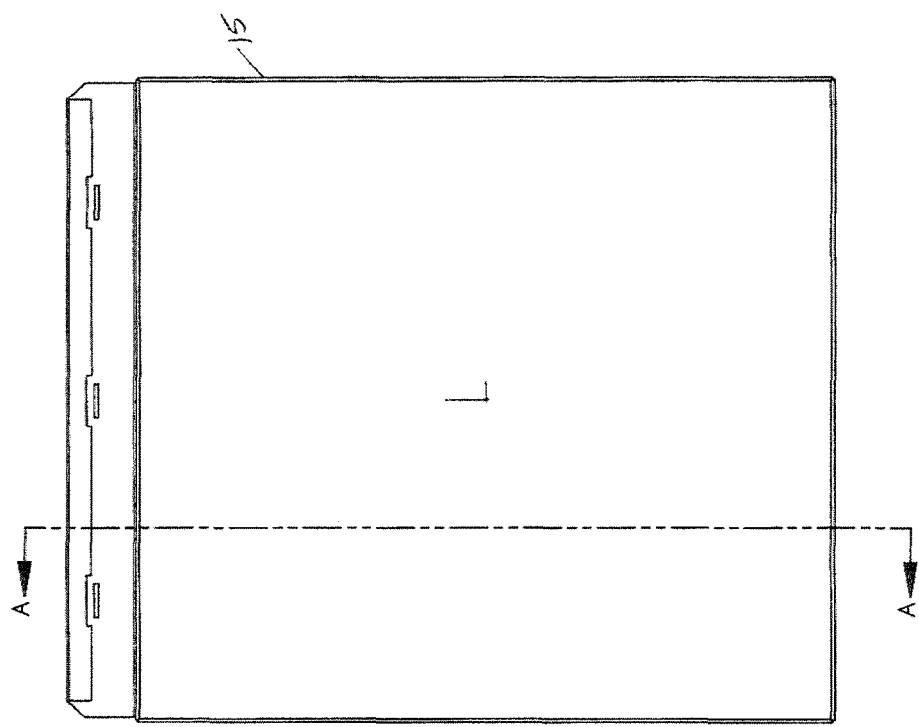

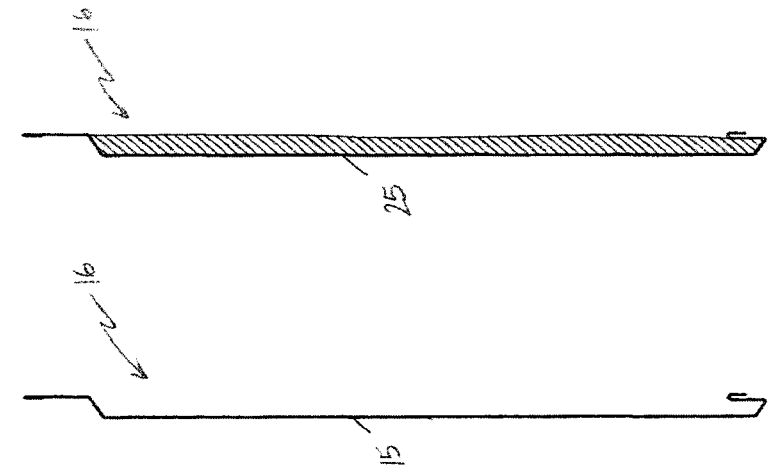
Figure 4d
Figure 4e
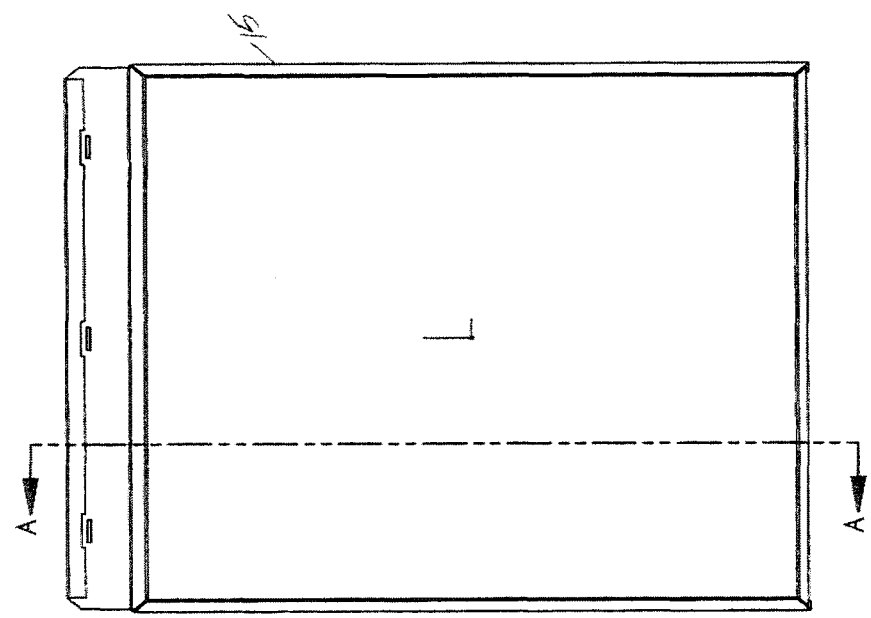
Figure 4c

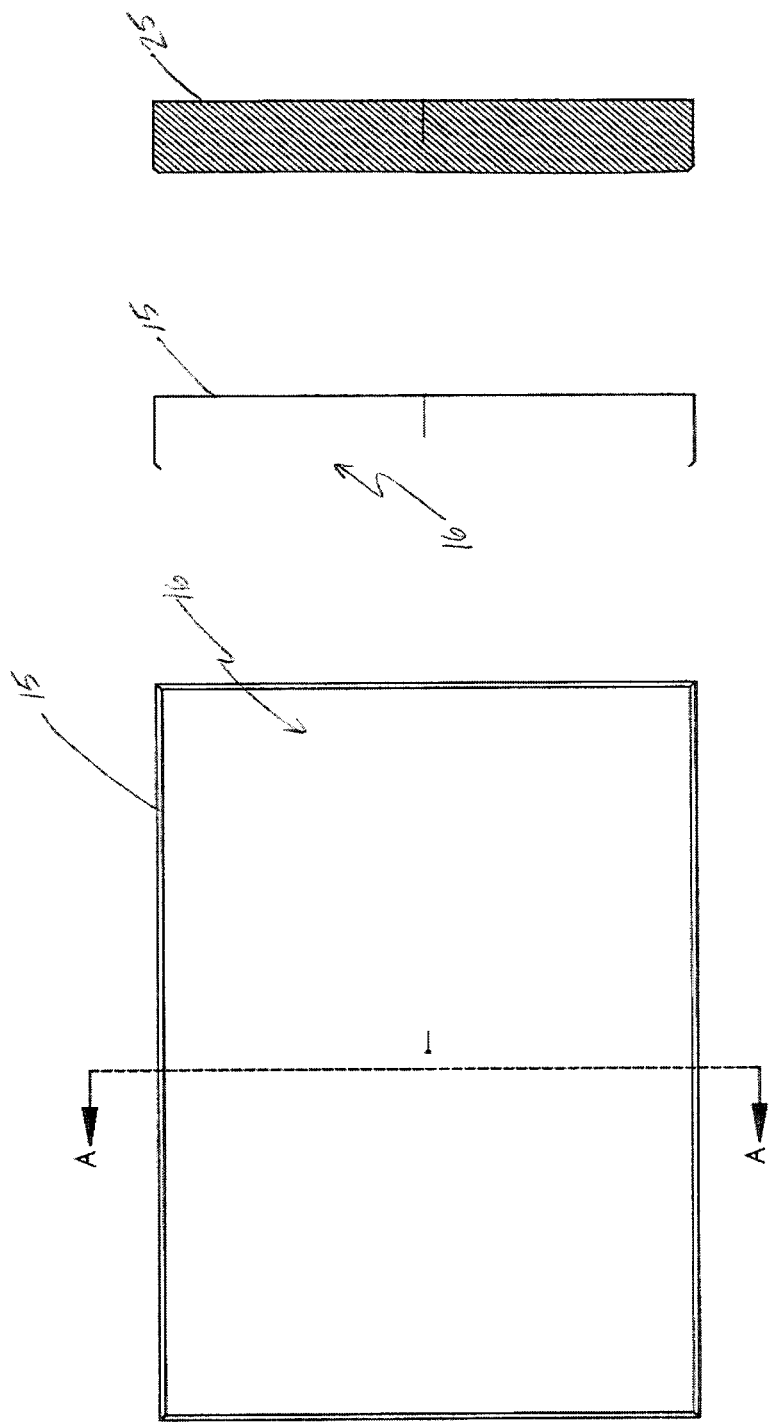

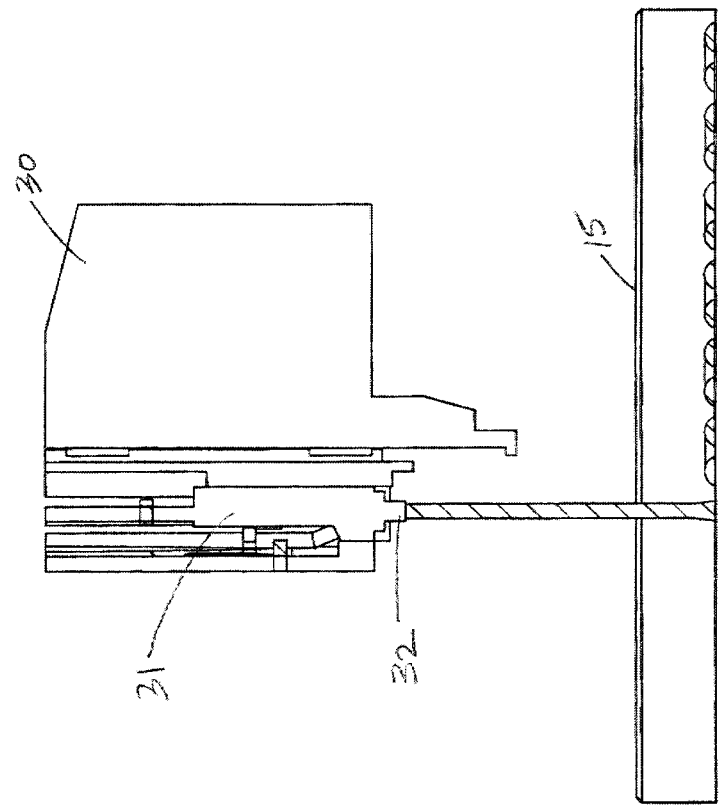
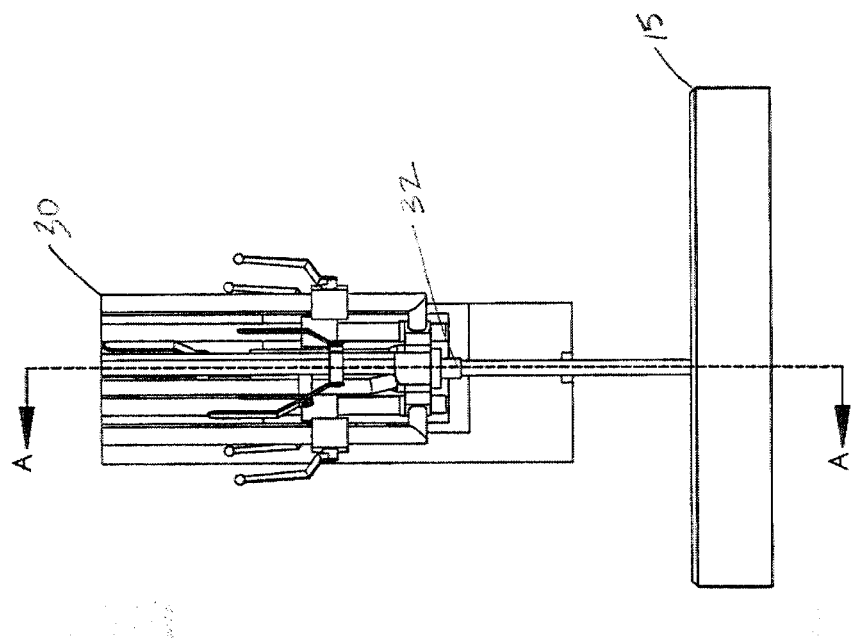

APPARATUS AND METHOD FOR MANUFACTURING INSULATED WALL PANELS

CROSS-REFERENCES

This application claims priority to U.S. Provisional Patent Application No. 61/498,414, filed Jun. 17, 2011, and to U.S. Provisional Patent Application No. 61/511,447, filed Jul. 25, 2011.

TECHNICAL FIELD

An apparatus and method for manufacturing insulated wall panels is provided. More specifically, an apparatus and method for manufacturing spray or pour foam insulated panel, such as external wall panels and curtain wall panels is provided.

BACKGROUND

Prefabricated insulated exterior wall panels are designed to span multiple floors of a building, and are being constructed to withstand thermal changes (e.g. temperature-related expansion and contraction), moisture and condensation buildup, wind and other forces, while at the same time keeping air and water from penetrating the building envelope and contributing to a decorative appearance. Due to new Leadership in Energy and Environmental Design ("LEED") standards, current insulated panels, such as curtain wall "backpanels" or external aluminum composite panels (ACPs), are necessarily being constructed to provide thermal efficiency (i.e. high heat transfer coefficient) for cost-effective heating, cooling and lighting in a building, while contributing to a decorative and aesthetically pleasing exterior appearance.

Aluminum Composite Panels (ACPs) are commonly used as external wall panels in building construction for external cladding (building facades), for insulation and/or for signage. Existing ACPs typically comprise a non-aluminum internal core bonded with one aluminum sheet, or sandwiched between two sheets, depending upon the type and style of panel. For instance, ACPs may comprise two external aluminum sheets, or "skins", that are adhered together by an internal insulating core. Where two sheets are utilized, a thermal plastic core such as, for example, a polyethylene (PE) or other polymer foam material (e.g. expanded polyurethane or expanded resin) may be used. Various forms of ACPs are known including, without limitation, Reynobond® panels, Alucobond® panels and Alpolic® panels.

Curtain walls can comprise a non-structural exterior covering of a building, and are typically constructed with extruded aluminum or steel members. The metal frame of the curtain wall is typically non-load bearing and can house glass or other opaque decorative coverings that are used in combination with internal, insulated "backpanels", known as "curtain wall panels".

Although not apparent from the exterior of the building, the backpanels in a curtain wall system often comprise considerable insulation. The backpanels are not only designed to withstand thermal changes, moisture and condensation, wind and other forces, while at the same time keeping air and water from penetrating the building envelope, but they are also designed to maintain pressure and temperature consistency in the intentional gap formed between the backpanel and the decorative opaque covering.

Unlike ACPs, insulated curtain wall backpanels may comprise formed sheet(s) of steel or aluminum and a cavity or "back-section" filled with insulation. Traditionally, insulated backpanels may comprise rigid fiberglass or mineral wool insulation fastened inside a cavity formed from a single sheet of aluminum or steel. Alternatively, one form of insulated composite panel comprises two external aluminum or steel sheets having expanded insulating material sandwiched therebetween. For instance, as described in U.S. Pat. No. 3,530,029, composite panels may be formed by aligning equal lengths of sheet material, disposing a preformed insulating material therebetween and compressing the three layers in a press to form a length of panel. The insulating material may a polymer foam material (e.g. expanded polyurethane or other expanded resin) arranged between the two skins.

One common form of rigid wool insulation in traditional backpanels is Roxul CurtainRock®, which is a semi-rigid stone wool insulation board. Where rigid insulation is used, the aluminum or steel sheets are shaped to conform to sizes and shapes in compliance with the desired building design and then coated with a sealant to create a water and air barrier. Each formed cavity is then prepared to receive and secure expandable or rigid insulation. For example, "stickpins" can be installed to extend from the interior surface of the panel and are then coated with adhesive and used to hold the insulation in position.

The success of this insulation process depends upon the skill of the worker to adequately coat the pan and stickpins with the sealant and/or adhesive and then to pre-cut the insulation to the size of the backpan (i.e. to minimize gaps between the insulation and the backpan). Problems arise where the sealant is misapplied, resulting in air and water entering the backpan and causing the buildup of condensation. Further, thermal "shorts" or weaknesses often result where the insulation has not been installed properly and where it must part to allow the stickpins to puncture through the fibrous material. As a result, fluctuations in air pressure cause airflow through the gaps which can cause "whistling" noises. Heat buildup behind the insulation can also cause "drumming" noises due to vibration of the metal skin of the backpan and condensation buildup in the space between the insulation and the metal skin. Semi-rigid insulation can sag and weaken over time, causing the necessity for costly maintenance or repair. Finally, offcut insulation cannot be reused and creates waste.

Existing insulated ACPs and curtain wall panels also require additional attachment means such as, non-integrated extruded aluminum fasteners for installing the insulated panel to the building wall. The required attachment means complicates the installation process and requires that the panels conform to precise size and shape specifications. The complex panel attachment methods and the current types of insulation further restrict the ability to adapt or change the size and shape of the insulated panels on site, as may be required where building or architectural designs changes.

There exists a need for an efficient system of manufacturing insulated exterior wall panels and curtain wall backpans, each made from one piece of aluminum or steel and an effective and efficient form of insulation, thereby eliminating the need for both traditional curtain wall backpanel elements and complicated composite panel construction. There is further a need for a system of manufacturing insulated wall panels having integral attachment means. There is need for a system capable of manufacturing lighter external wall panels and backpanels which are made of one piece of metal and insulated with a spray- or pour-foam insulation. The system may be entirely automated.

SUMMARY

An apparatus for manufacturing unitary insulated wall panels is provided, the apparatus comprising bending means capable of bending or forming a panel from a sheet of metal. The panel is formed to have a cavity comprising at least one sidewall and a bottom wall for receiving and containing the insulation, and attachment means, integral to the at least one sidewall, for affixing the panel to a wall. The apparatus further comprises insulation application means for applying expandable foam insulation to the cavity.

A method of manufacturing a unitary insulated wall panel is further provided, the method comprising the steps of (1) bending a sheet of metal to form a panel having an enclosed cavity capable of receiving and containing foam insulation, and integral attachment means for attaching the panel to a wall system and (2) applying expandable foam insulation to the cavity.

A unitary insulated wall panel forming an enclosed cavity capable of receiving and containing foam insulation and having integral attachment means extending from the panel for attaching the panel to a wall system, wherein the insulation comprises expandable foam insulation is further provided.

BRIEF DESCRIPTION OF THE FIGURES

FIG. 1 shows perspective view of the present apparatus,

FIG. 3e shows a cross-sectional view of the panel in FIG. 3c taken along lines "A-A" with insulation, FIG. 4e shows a cross-sectional view of the panel in FIG. 4c taken along lines "A-A" with insulation, FIG. 6b shows a plan view of the backpan depicted in 6a, FIG. 6c shows a cross-sectional view of the backpan depicted in 6b taken along the lines "A-A" without insulation, FIG. 6d shows a cross-sectional view of the backpan depicted in 6b taken along the lines "A-A" with insulation, FIG. 8b shows a front view of the insulation applicator, and FIG. 8c shows a side view of the insulation applicator.

DESCRIPTION OF EMBODIMENTS

Figure 2A:
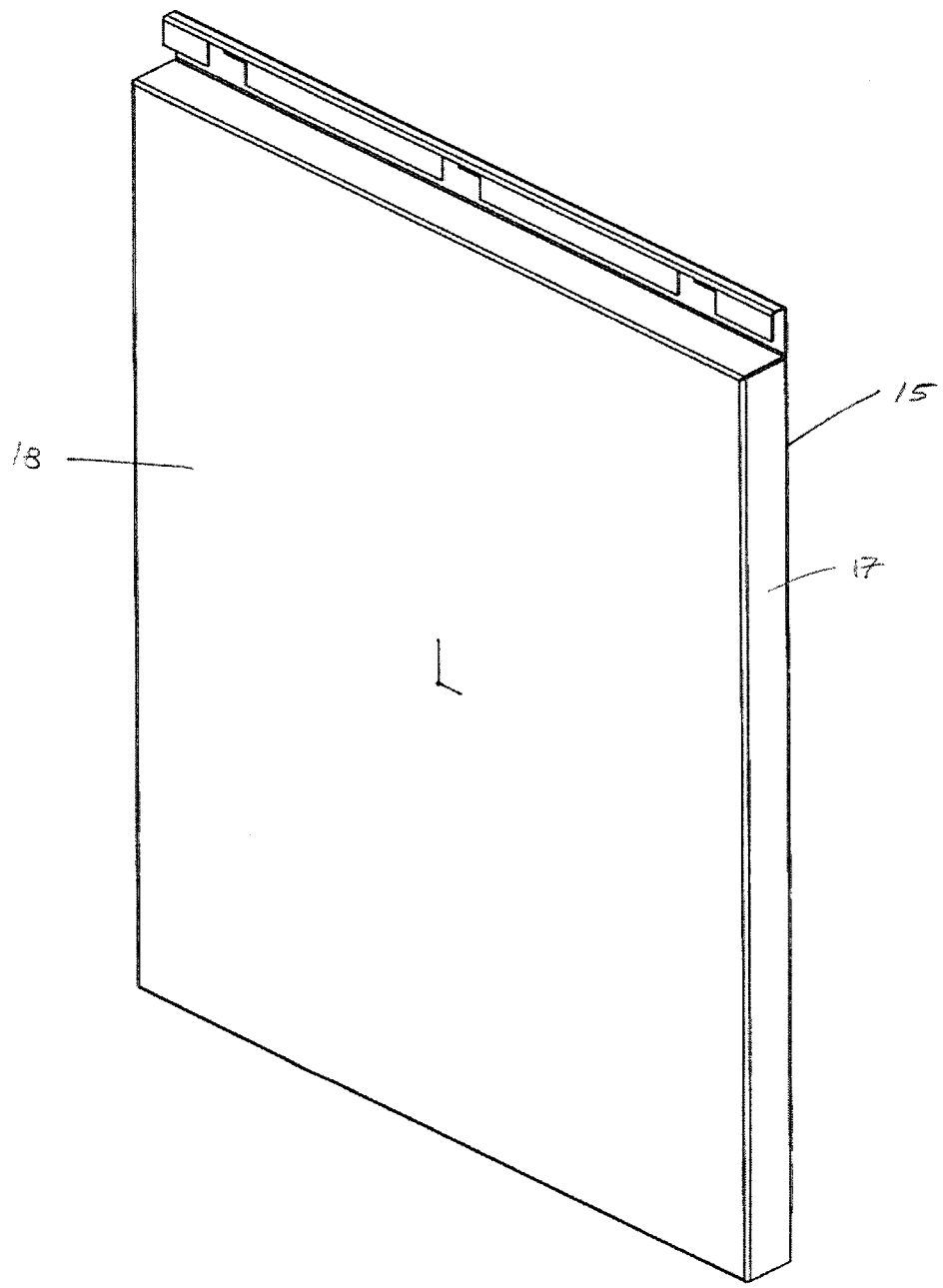
FIG. 2a shows a front (external) perspective view of a wall panel (e.g. a Strataclad™ internal square lock panel)
Figure 2B:
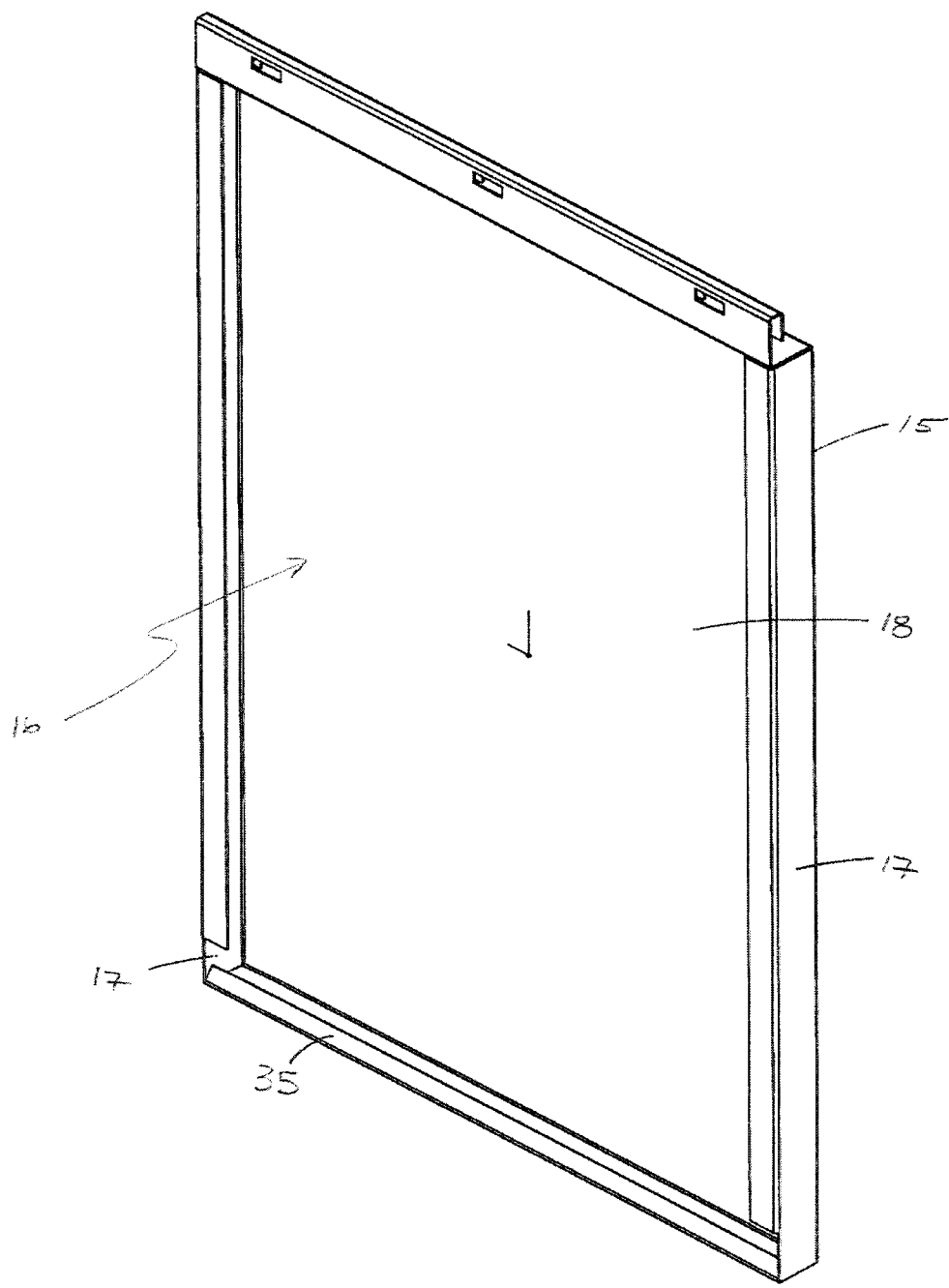
FIG. 2b shows a rear (internal) view of the wall panel depicted in 2a, FIG. 2c shows a front plan view of the wall panel depicted in 2a, FIG. 2d shows a cross-sectional view of the panel in FIG. 2c taken along lines "A-A" without insulation.
Figure 2E:
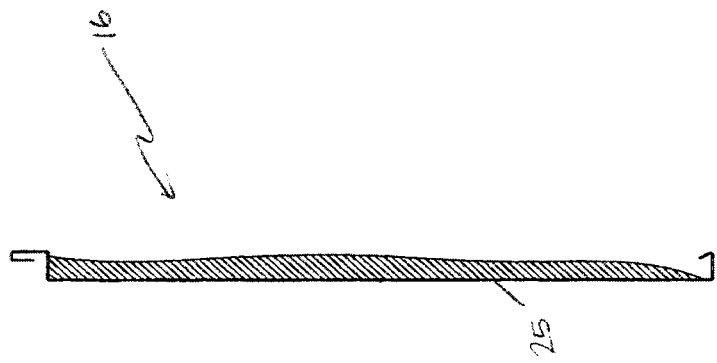
FIG. 2e shows a cross-sectional view of the panel in FIG. 2c taken along lines "A-A" with insulation.
Figure 2D:
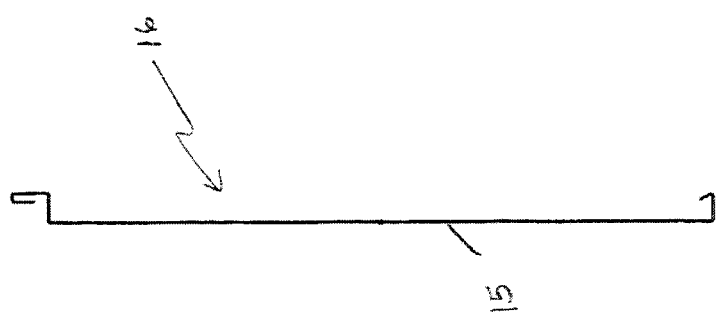
Figure 2C:
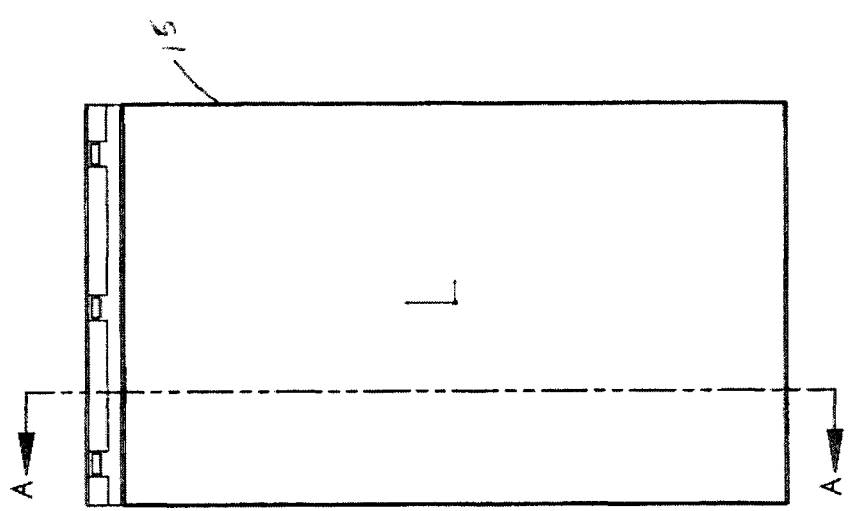
Figure 3A:
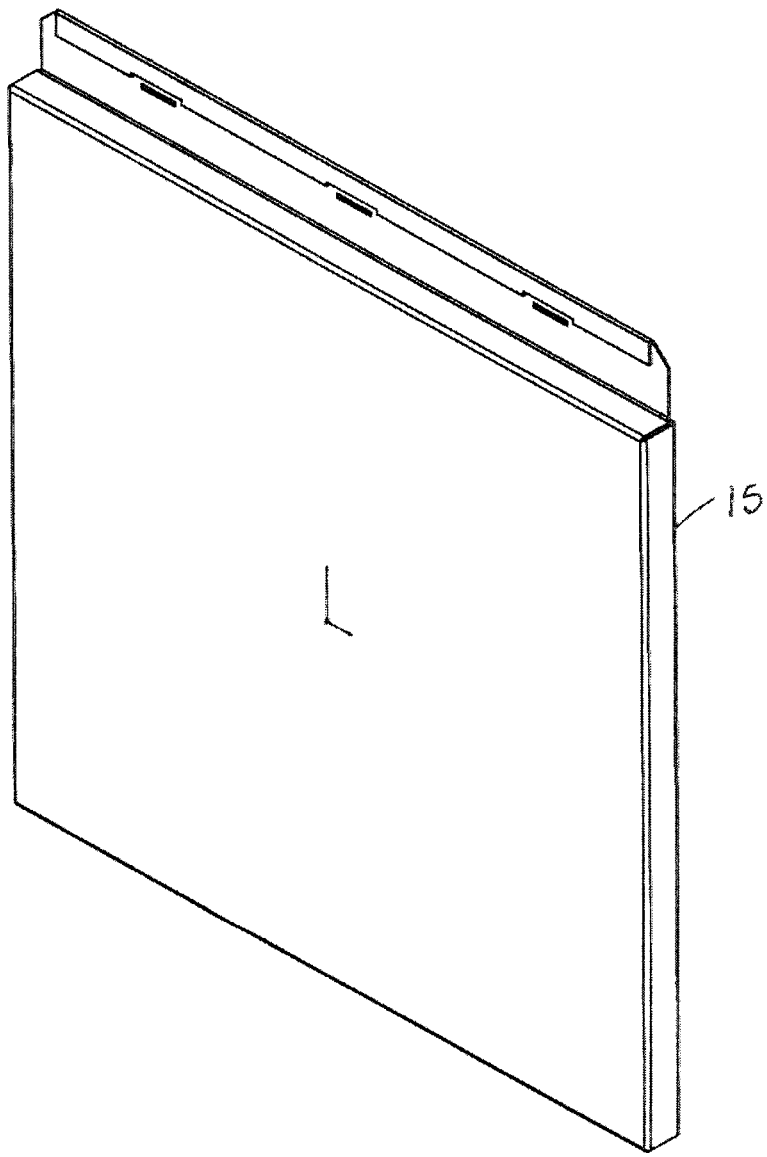
FIG. 3a shows a front (external) perspective view of a wall panel (e.g. a Strataclad™ vertical locking panel)
Figure 3B:
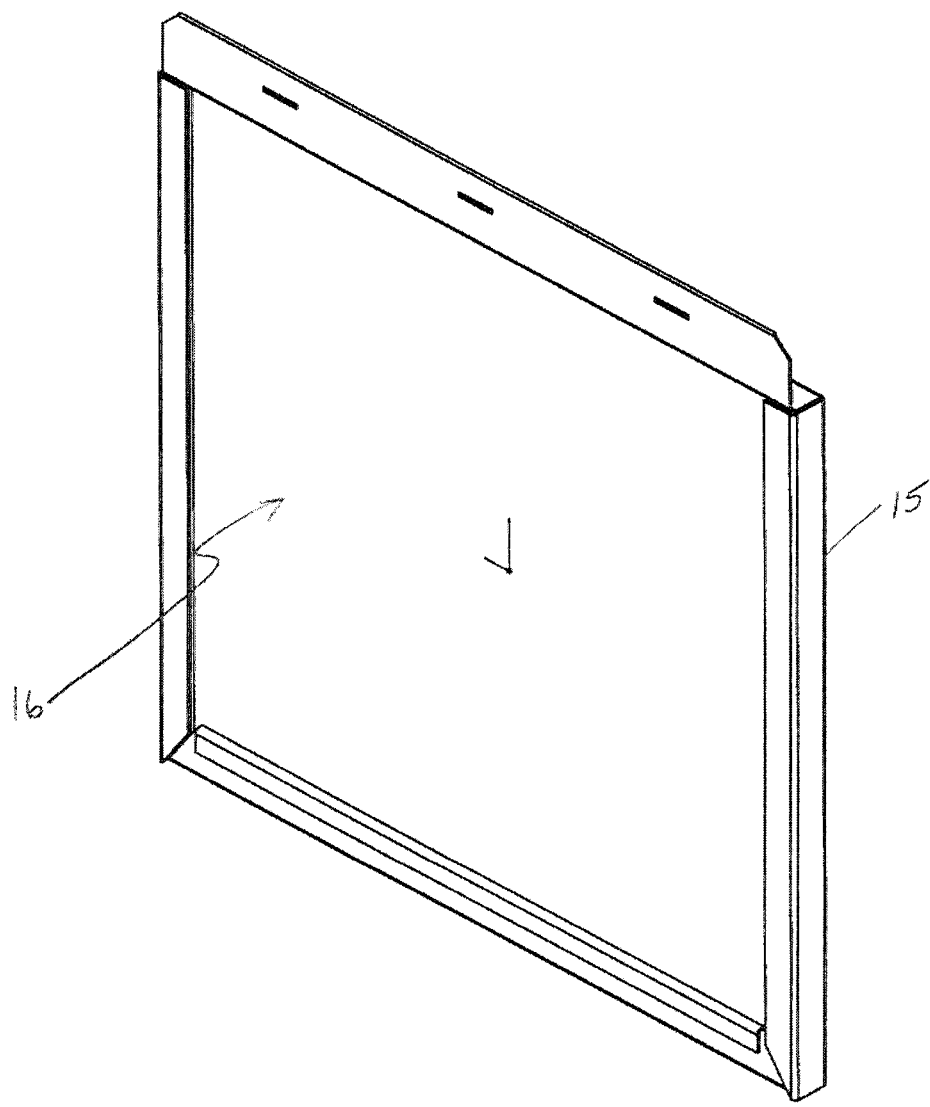
FIG. 3b shows a rear (internal) view of the wall panel depicted in 3a, FIG. 3c shows a front plan view of the wall panel depicted in 3a, FIG. 3d shows a cross-sectional view of the panel in FIG. 3c taken along lines "A-A" without insulation.
Figure 4A:
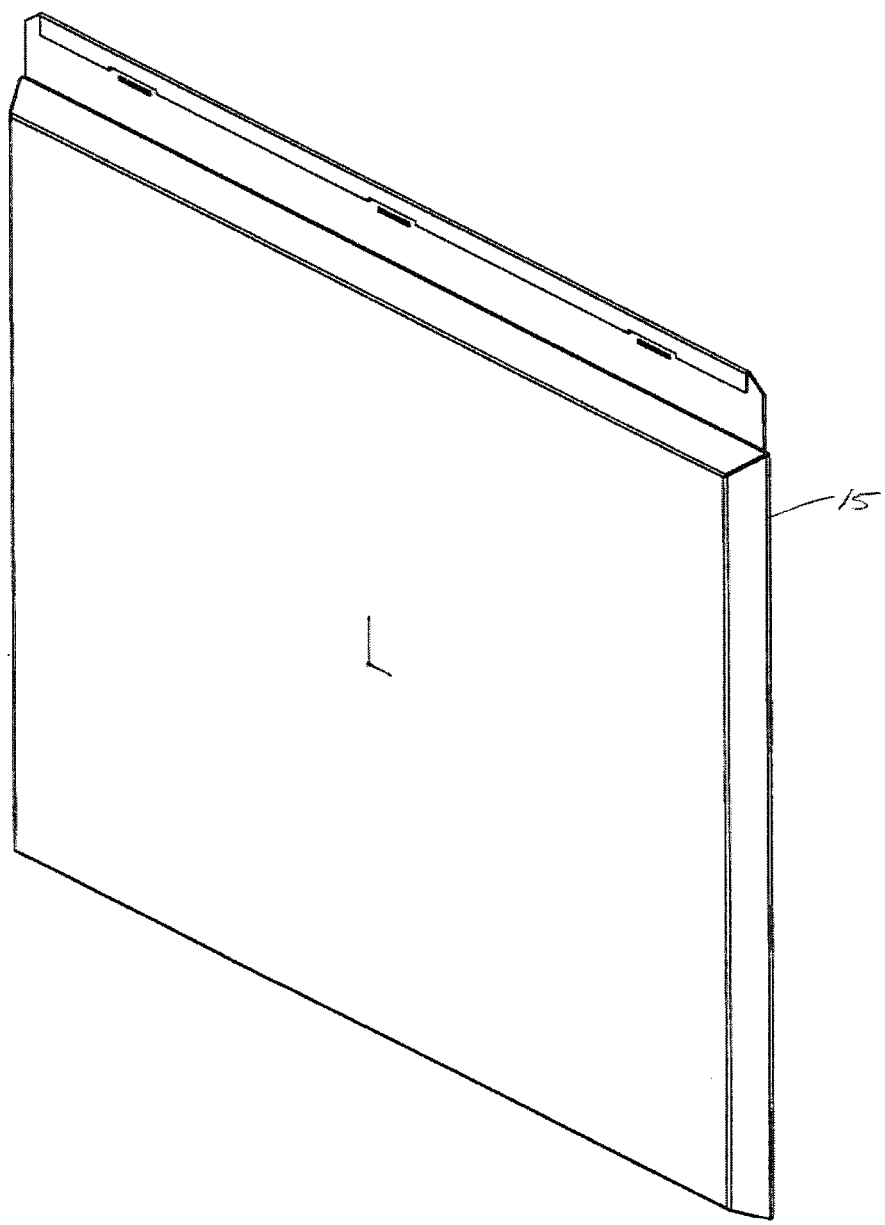
FIG. 4a shows a front (external) perspective view of a wall panel (e.g. a Strataclad™ bevelled vertical locking panel)
Figure 4B:
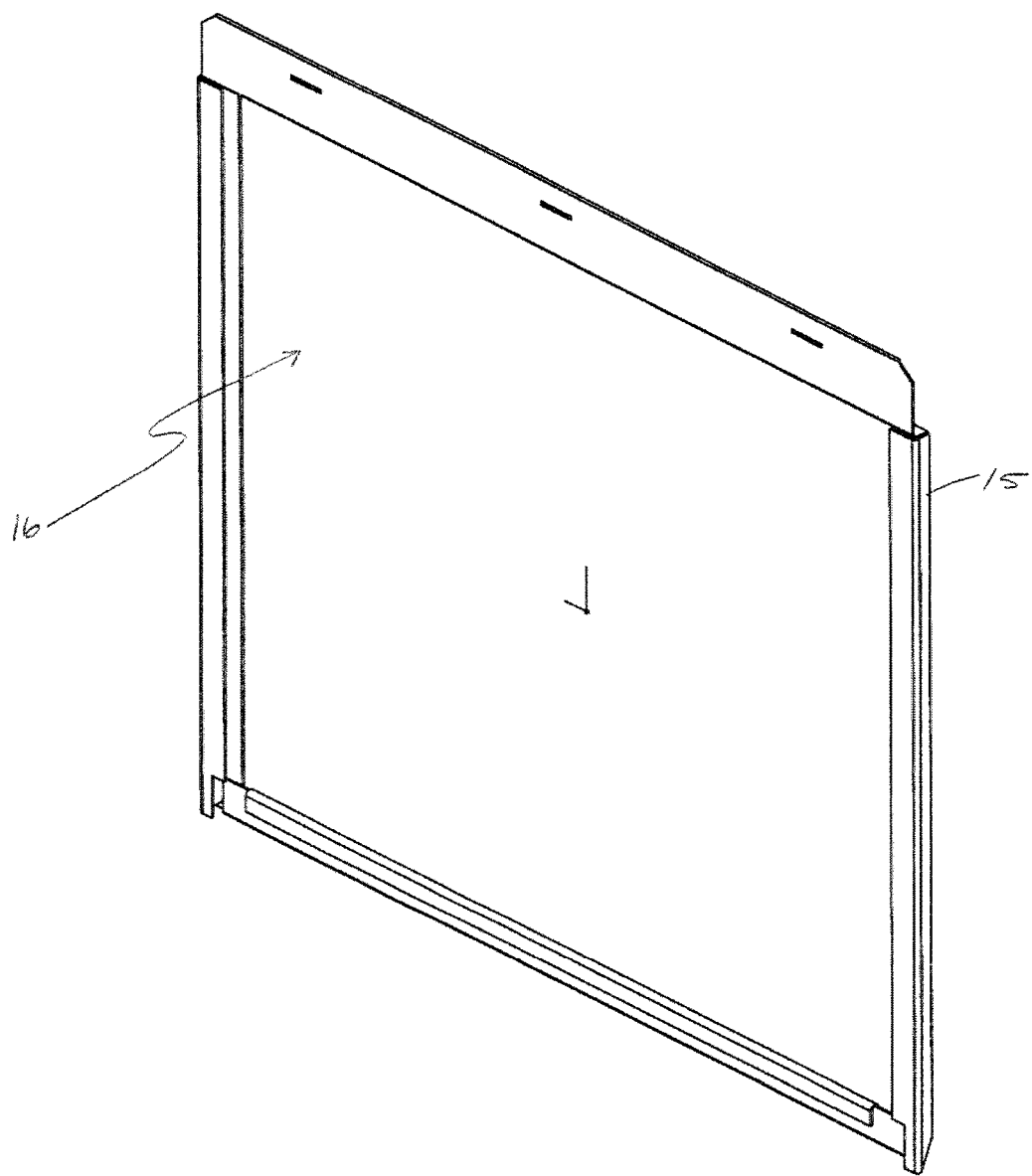
FIG. 4b shows a rear (internal) view of the wall panel depicted in 4a, FIG. 4c shows a front plan view of the wall panel depicted in 4a, FIG. 4d shows a cross-sectional view of the panel in FIG. 4c taken along lines "A-A" without insulation.
Figure 5A:
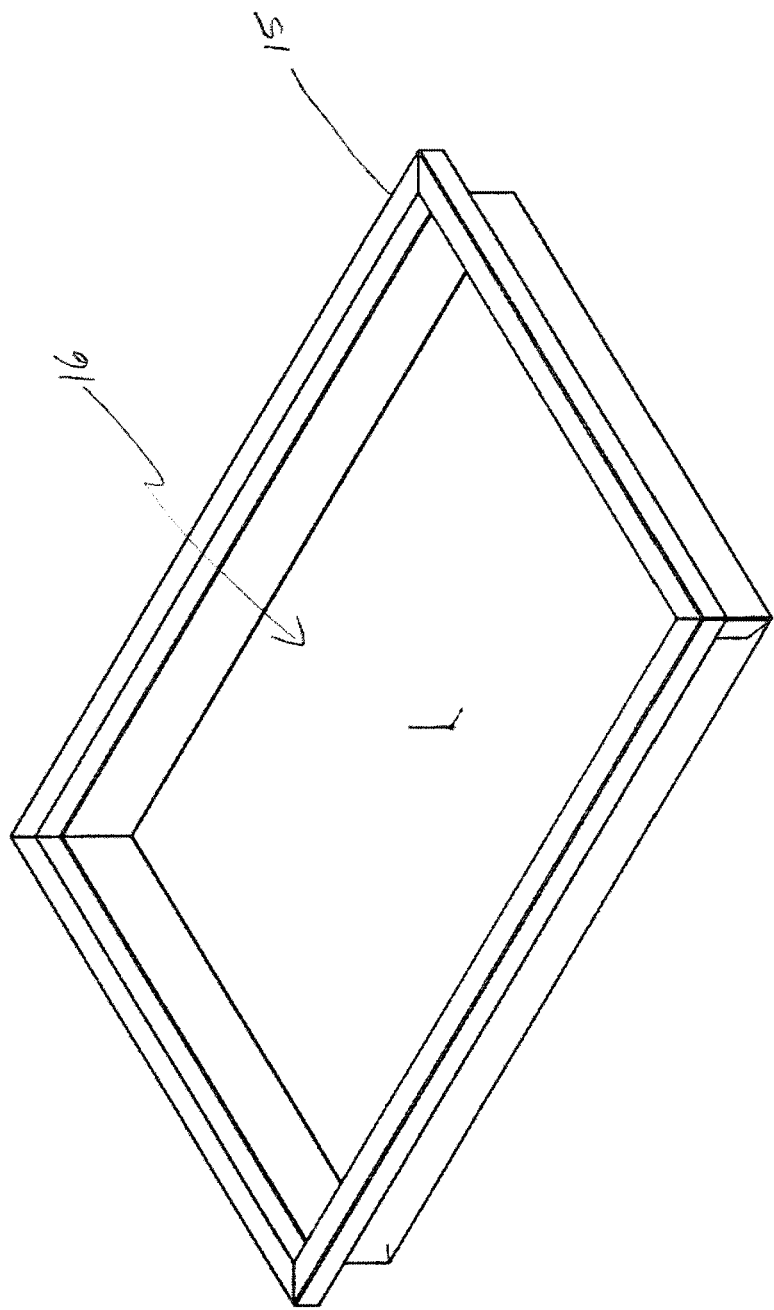
FIG. 5a shows a rear (internal) perspective view of a curtain wall backpanel (e.g. an Envatherm™ box-style backpan)
Figure 5B:
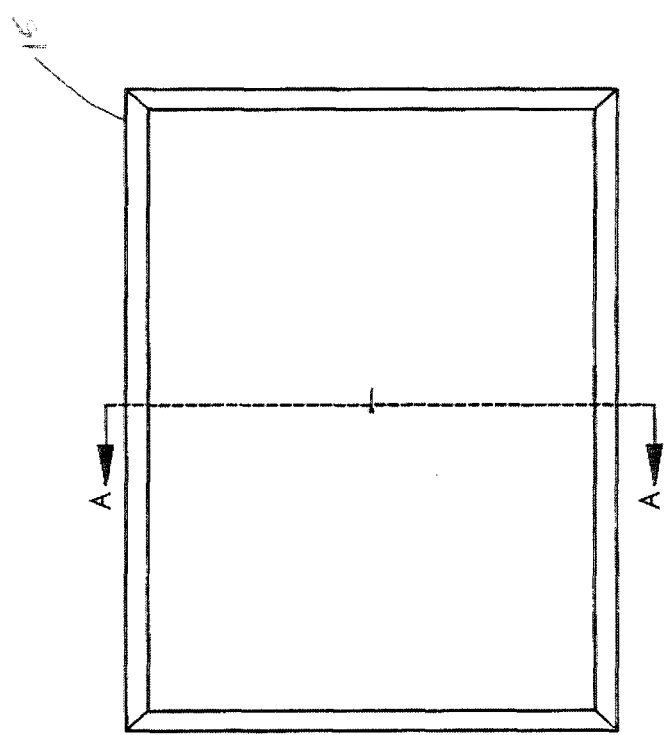
FIG. 5b shows a plan view of the backpan depicted in 5a, FIG. 5c shows a cross-sectional view of the backpan depicted in 5b taken along the lines "A-A" without insulation.
Figure 5C:
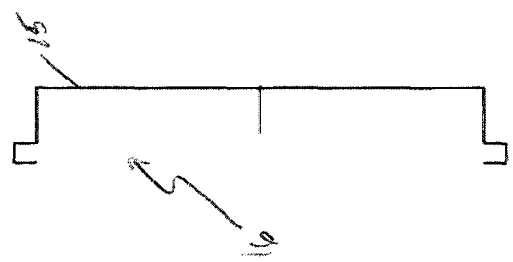
FIG. 5d shows a cross-sectional view of the backpan depicted in 5b taken along the lines "A-A" with insulation.
Figure 5D:
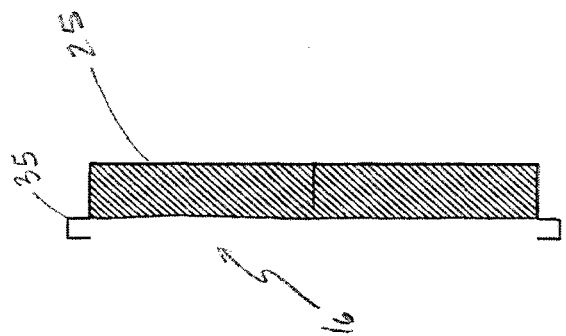
Figure 6A:
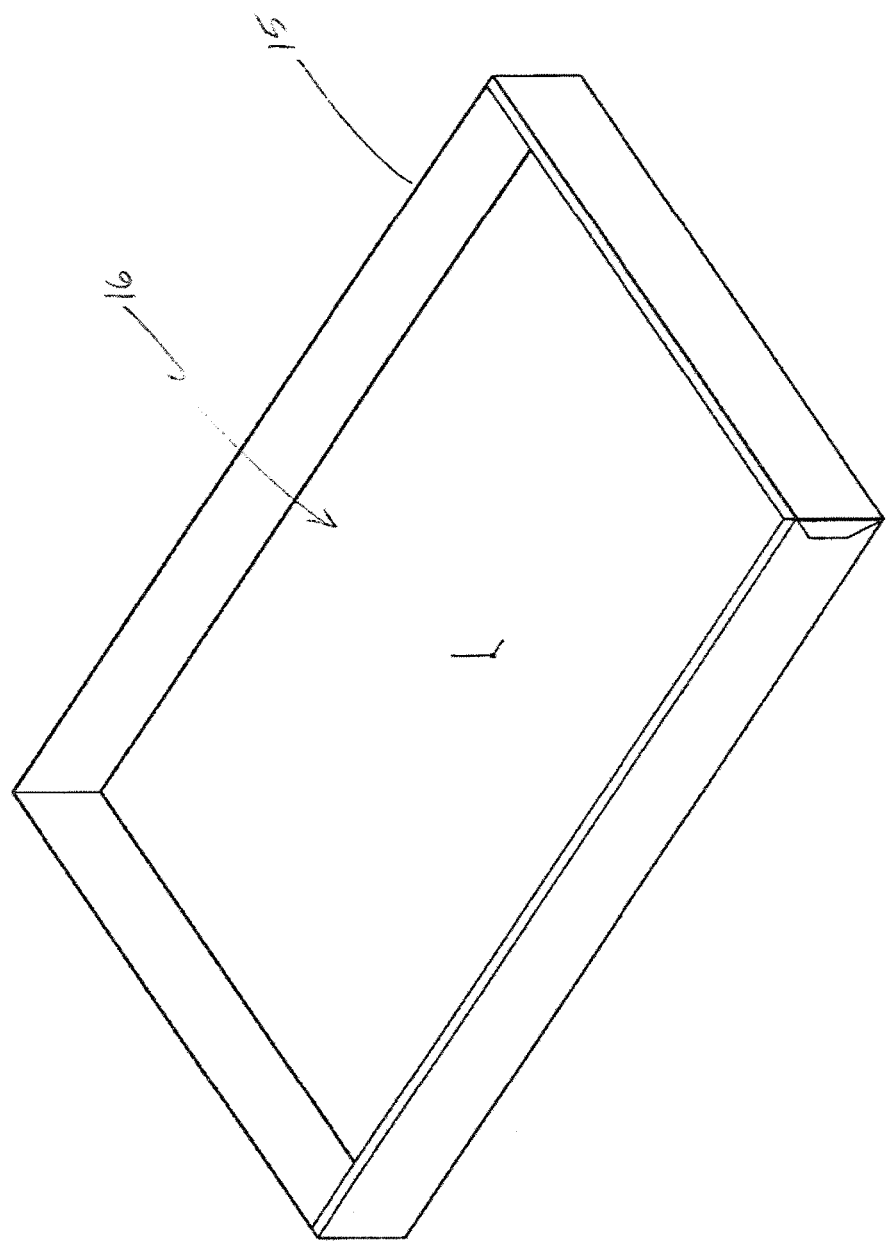
FIG. 6a shows a rear (internal) perspective view of a curtain wall backpanel (e.g. an Envatherm™ inner flange backpan)
Figure 7A:
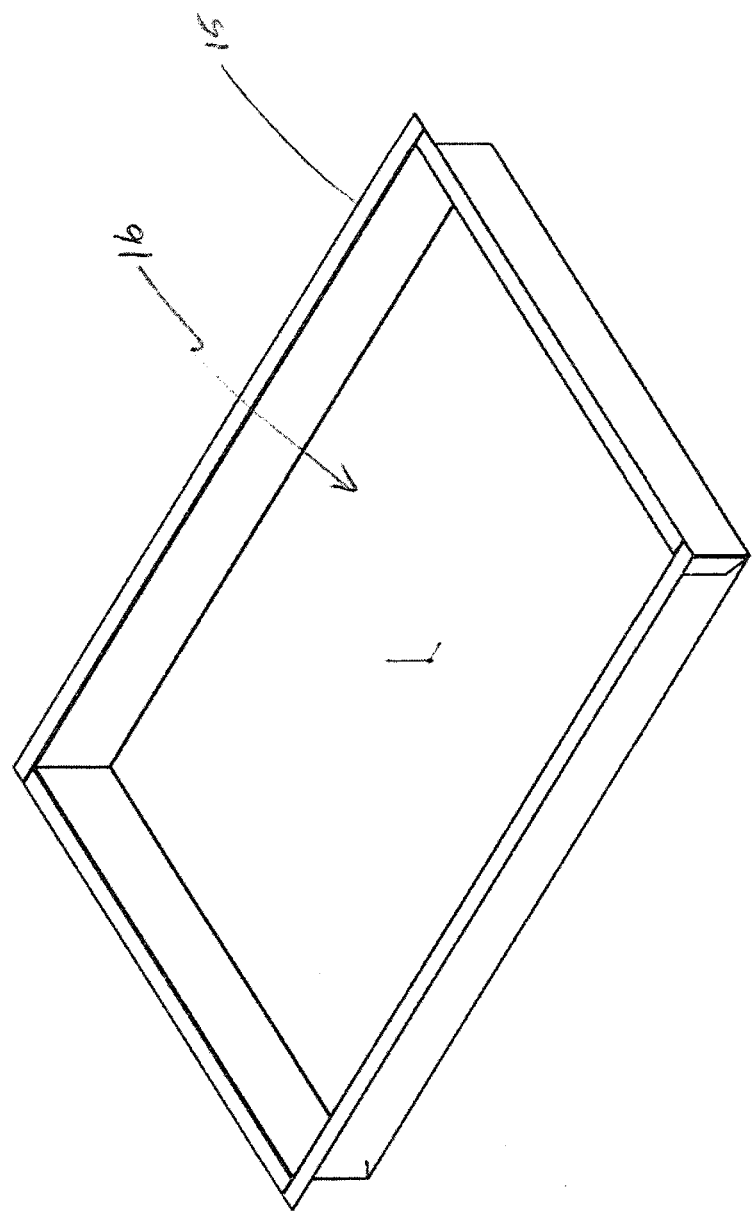
FIG. 7a shows a rear (internal) perspective view of a curtain wall backpanel (e.g. an Envatherm™ square flange backpan)
Figure 7D:
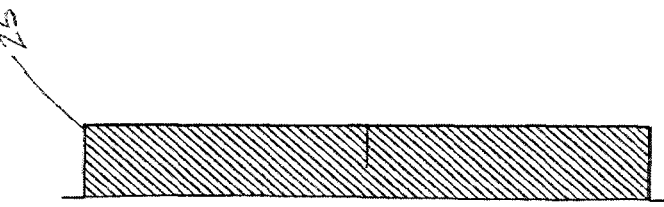
FIG. 7d shows a cross-sectional view of the backpan depicted in 7b taken along the lines "A-A" with insulation.
Figure 7C:
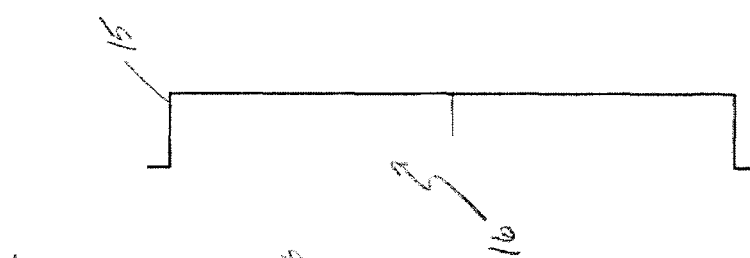
FIG. 7b shows a plan view of the backpan depicted in 7a, FIG. 7c shows a cross-sectional view of the backpan depicted in 7b taken along the lines "A-A" without insulation.
Figure 7B:
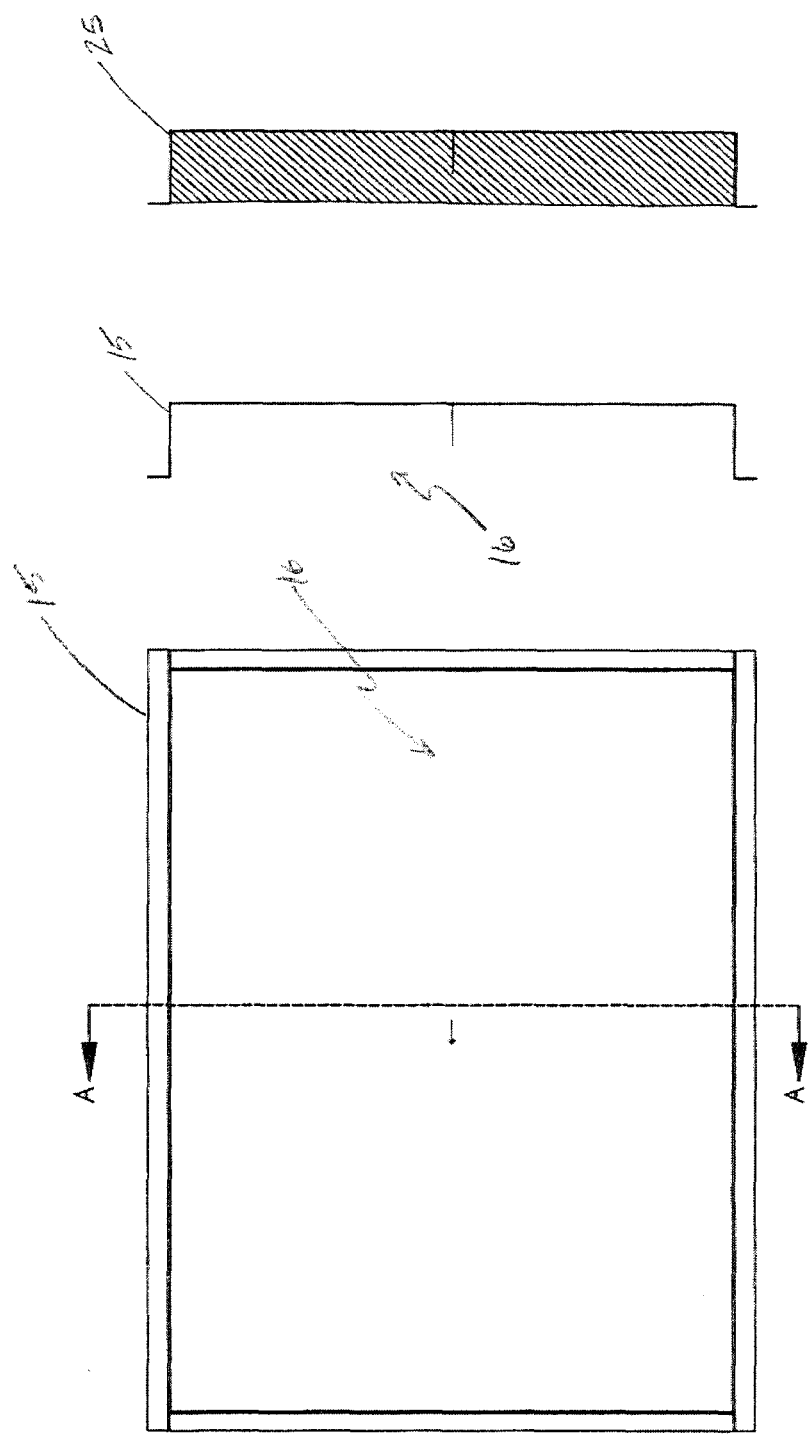

A method and apparatus is provided for manufacturing an insulated external wall panel and curtain wall backpanel formed from a unitary (i.e. non-sandwiched) piece of metal, wherein the panel forms a cavity for receiving non-rigid, expandable pour- or spray-foam insulation, and integral attachment means for positioning the panel on the wall and/or in conjunction with adjacent panels and fastening elements, as required. A pour- or spray-foam insulated external wall panel and curtain wall backpanel, as manufactured by the present method or apparatus, is also provided.

Having regard to FIG. 1, the present apparatus 100 comprises providing a means of forming or bending a single sheet of metal, such as aluminum or steel, into an individual unitary panel. In one embodiment, the "bender" 10 may be automated and may be capable of receiving flat sheets of metal 5 and forming them into bent panels 15 having a variety of shapes, sizes and dimensions (FIGS. 2-7). Each bent panel 15 forms an interior cavity 16, having at least one sidewall 17 and a bottom wall 18, for receiving and containing the foam insulation, whereby the cavity is enclosed and capable of retaining the insulation. For example, where the panel is square or rectangular in shape, the cavity may comprise four sidewalls 17 and a bottom wall 18. It is contemplated that the panel bending process may be manual or partially manual, for example, where panels are custom made.

Each panel 15 also forms integral attachment means, comprising at least one flange 35 of various shapes and sizes extending from the panel 15. For example, the at least one lateral flange 35 may extend from one or all of the at least one sidewall(s) 17. In one embodiment, the attachment means may be used in accordance with a pre-existing fastening assembly to house the panel, such as in a curtain wall system. In another embodiment, the attachment means may not only be utilized to affix the panel directly to the wall, such as in an external wall panel system, but may also be utilized as an interlocking means to affix the panel to adjacent panels (or other exterior components, such as windows) on the wall. For instance, the integral attachment means are designed to connect the panel to corresponding attachment means on the wall system, on adjacent panels and other structures, or both.

Having regard to FIGS. 2-7, square or rectangular panels 15 may vary in size from, for example, a minimum dimension of approximately 14"×14" to a maximum dimension of approximately 52"×96". The panels may also vary in depth having, for example, a maximum depth of 6" and a minimum depth of 1½". Varied depth and tapered panels may provide a decorative exterior to a building wall system where some panels may rest flush against the surface of the building, while others protrude outwardly. It is understood that the present bent panels 15 may be any size, shape or dimension as may be architecturally or structurally required.

The present apparatus 100 may further comprise clinching means (not shown), such as a Norlok Surelok III, for creating a clinchlok joint at each corner of the bent panel 15. The clinchlok joint may be formed by any means capable of squeezing and securing the sides of the bent panel 15. For example, the clinchlok may be formed by a rounded punch and die capable of creating a "mushroom" seal, thereby eliminating or reducing the need to penetrate the panel walls with rivets or other sealing means.

The present apparatus 100 may further comprise heating means 20, such as an oven, for heating the panel 15. Such heating means 20 may be utilized to optimize adhesion of the pour- or spray-foam to the at least one sidewall(s) 17 of the panel 15 upon application of the insulation. Optimizing adherence of the insulation foam to the at least one sidewall(s) 17 of the cavity 16 can prevent the foam insulation from peeling away from the at least one sidewall(s) 17 and collapsing inwardly, thereby providing sufficient insulation density and reducing the amount of foam required to fill the cavity 16. In one embodiment, the oven 20 may be used to heat the bent panels 15 to between approximately 80-100° F. In a preferred embodiment, the oven 20 may be utilized to heat the bent panels 15 to approximately 95° F.

Figure 8A:
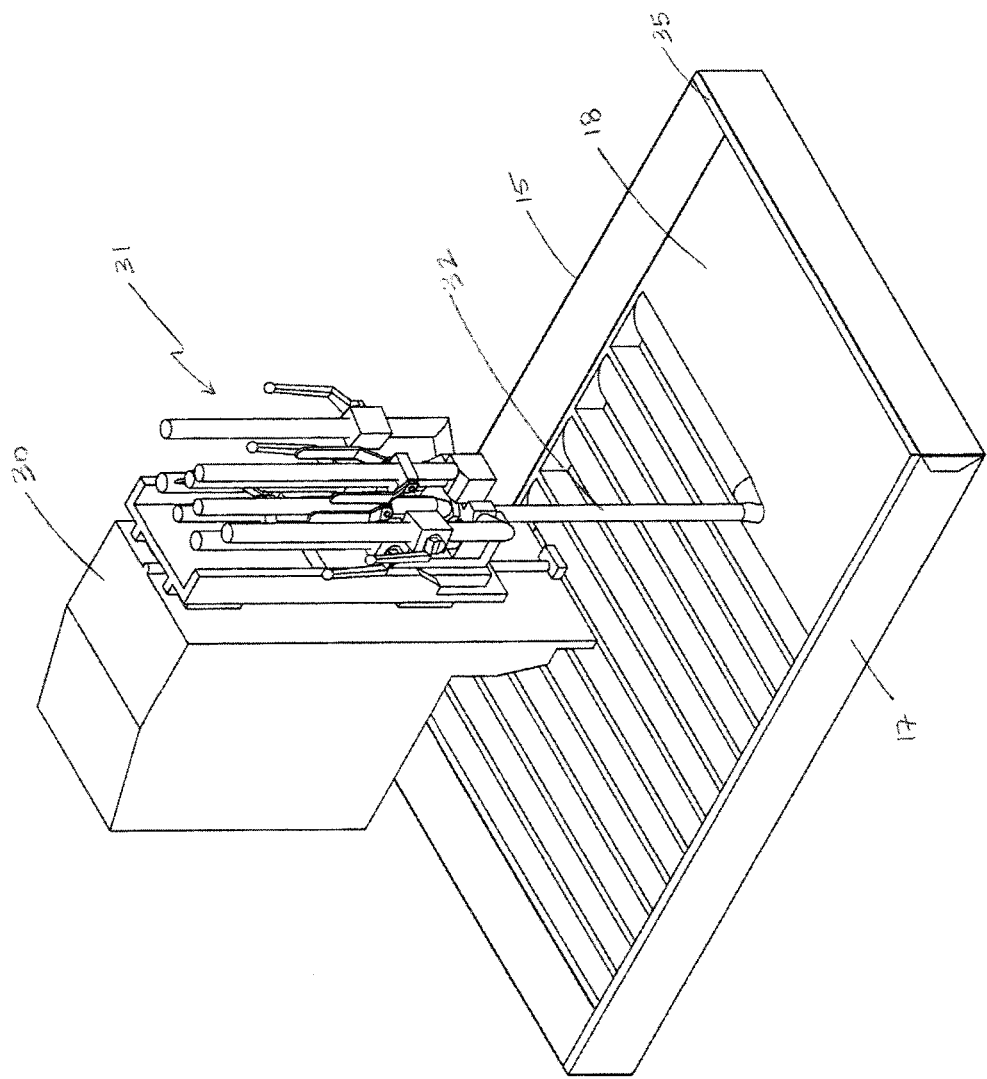
FIG. 8a shows a perspective view of the insulation applicator applying the foam insulation to a panel.

Having regard to FIGS. 8a-8c, the present apparatus 100 further comprises insulation application means 30 for applying the pour- or spray-foam insulation into the enclosed cavity 16 of the bent panel 15. It is contemplated that the insulation applicator 30 may be manually operated or automated, and, where automated, may be in communication with, and programmed to receive, the bent panel 15 from the bender 10.

Having regard to FIGS. 8a-8c, the insulation applicator 30 may comprise an applicator head 31 having a nozzle 32 for spraying or pouring the foam insulation into the cavity 16. Where automated, the insulation applicator 30 may be programmed to manoeuvre the nozzle 32 above the cavity 16. In order to optimize the insulation process, a pre-determined amount of foam may be dispensed at a pre-determined rate and pressure in a pre-determined pattern. The amount of foam and rate of application may vary depending upon the size, shape and depth of the panel. The process may optimized to ensure that the panels are not overfilled, thereby reducing the use of an excess volume of foam and providing sufficient air (density) within insulation.

In one embodiment, the applicator head 31 may further be designed to mix some or all of the foam insulation material prior to applying the foam to the cavity 16. In another embodiment, some or all of the foam material may be pre-mixed.

In one embodiment, a panel 15 having at least one sidewall 17 with a 4 inch depth may receive approximately 37-39 cc of foam insulation per second, dispensed at a rate of 750 lineal inches per minute. A panel having at least one sidewall with a 1½ inch depth may receive approximately 22 cc of insulation at a speed of 800 lineal inches per minute. Having regard to FIG. 8a, application of the foam may commence at a position inset from the at least one sidewall(s) 17 of the cavity 16, thereby providing sufficient space for the insulation to expand. The inset position may further prevent use of excess insulation and prevent the insulation from spilling over the edge of the at least one sidewall(s) 17 and into the panel attachment means 35 (e.g. see FIG. 5d). Preferably, the insulation may be applied in a particular pattern (e.g. horizontal zig-zagging lines along the bottom wall 18, see FIG. 8a) to optimize coverage of the entire cavity 16. The distance between the zig-zagging lines may also be determined to further optimize the amount of insulation used.

The pour- or spray-foam insulation may be expandable foam insulation material (e.g. plastic material), wherein the material is capable of adhering to a metal panel and creating a seal therewith. The foam may expand rapidly, for example, at a ratio of 60:1. The foam insulation may further comprise a flame-retardant material (e.g. does not sustain flame upon removal of heat source), and will not melt or drip.

In one embodiment, the foam insulation may comprise polyurethane foam insulation. In another embodiment, the foam insulation may comprise a polyurethane open-cell spray foam insulation, wherein the insulation is capable of providing some water and air-permeability. Preferably, the foam insulation comprises the commercially available Icynene® open-cell spray foam insulation, having a 0.5 lb density free rise. It is contemplated that closed-cell foam insulation, low (water blown) or medium density (having blowing agents) foam insulation may be used. It is further contemplated that the foam may be pre-mixed, or mixed immediately prior to application to the panel (i.e. mixing means forming part of the insulation applicator 30).

The foam insulation may be efficiently applied or injected through the insulation applicator 30 (e.g. spray nozzle 32) into the cavity 16 of the bent panel 15, and may provide for accurate and rapid insulation of the bent panel 15. For example, each panel 15 may be insulated in approximately one minute.

Upon application, the foam insulation may solidify or "cure" to a near-solid state, thereby providing increased "racking strength" to the insulated panel 25 and reducing the need for additional strengthening means (e.g. such as the structural supports commonly required larger panels or the use of a thicker metal skin). The density and expansive nature of the foam may provide a reduction of thermal shorts and air flow/capture behind the insulation compared to traditional fibreglass or mineral wool insulation, thereby reducing "drumming" noise and potentially eliminating gaps in the seal causing "whistling" noises. The foam insulation may provide a lighter panel than those which incorporate traditional insulation methods or composite (sandwich) panels, and provide a means of insulating a panel without the use of stickpins.

In one embodiment, the present insulated panel 25 may be lighter than existing fiberglass or mineral wool insulated panels. Lighter panels can be manufactured in larger sizes and positioned higher on building structures. Further, due to the design of the panel 15, and the enclosed interior cavity 16, two insulated panels 25 can be joined together on-site, thereby effectively doubling the size of the insulated panel 25 positioned on the wall, while still providing a completely insulated system. The ability to accurately control the amount of foam applied to each panel 15 can reduce or nearly eliminate wasted foam.

It is contemplated that any expandable pour- or spray-foam material capable of filling, adhering to, and insulating an enclosed (or multiple sided), open faced cavity of a wall panel, having appropriate density and insulative characteristics, may be used. It is further contemplated that such insulation material should not be subject to loss of insulation ability (i.e. R value) over time, and should be capable of withstanding wind and gravitational forces, settling effects, moisture-related conditions, convection and air filtration. It is further contemplated that such foam insulation should not react with, or be impacted by, any sealants (such as Tremco Commercial Sealants) applied to the panel, or any affixing means, during installation.

The present apparatus 100 may optionally further comprise providing pressing means 40, capable of receiving the foam-insulated panels 25 and for containing the panels until the foam has cured or "solidified" (e.g. reaches a near-solid state). In one embodiment, the press 40 may be utilized to prevent overflow of foam outside of the panel, and to provide a smooth flat finish to the insulation (i.e. to stop the insulation from continuing to expand above the at least one sidewall(s) 17 of the cavity 16). The pressing means 40 or "press" may be adjustable to account for the size, shape and dimensions of the panels, including multi-sided panels. The press may be manually operated or automated and, where automated, be in communication with both the bender 10 and the insulation applicator 30 to provide an entirely automated and pre-programmable system. It is further contemplated that passage or conveyance of the panels through the present apparatus 100 may be entirely automated.

A method of manufacturing foam insulated wall panels is further provided, the method comprising, providing bending means 10 for forming a sheet of metal 5 into a bent panel 15 having an interior cavity 16 with at least one sidewall 17 and a bottom wall 18, and applying expandable pour- or spray-foam insulation to the cavity 16. The present method may optionally further comprise pressing the insulated panel 25 to contain the expanding foam insulation within the cavity 16 until the foam solidifies or cures.

In one embodiment, the present method may further comprise applying an air-permeable sheet or foil material to the insulated panel 25 before the panel 25 enters the press 40. The sheet or foil material may extend across the enclosed cavity 16, thereby covering the cavity 16. The sheet or foil may be a permeable material capable of maintaining air and moisture flow through to the insulation, while protecting the insulation from UV light or other contaminants to which the panel may be exposed during construction. The sheet or foil may further comprise a fire-retardant material. In one embodiment, the sheet or foil may comprise insulation vapour retarders or foil, which are commercially available, such as provided by LAMTEC® Corporation (www.lamtec.com).

Pour- or spray foam insulated external wall or curtain wall backpanels of various shapes and sizes are further provided. Each panel comprises a unitary panel forming an enclosed cavity 16, having at least one sidewall 17 and a bottom wall 18, and integral attachment means extending from the at least one sidewall(s) 17, for affixing the insulated panel 25 to a wall system and/or to adjacent insulated panels or other structures. The present insulated panels 25 may be utilized and installed in residential or commercial buildings. For example, having regard to FIGS. 2-4, the present exterior wall panels may be utilized to provide raised, revealed decorative paneling where traditional Aluminum Composite Panels (ACPs) are utilized. Further, having regard to FIGS. 5-7, the present insulated curtain wall backpanels may be installed on common curtain wall structures, and may provide considerable insulation behind spandrel glass or any opaque panel.

The present apparatus 100 and method provide a system of manufacturing insulated panels 25 having a reduced gauge of steel or aluminum compared to traditional panels, resulting in a lighter panel that may be larger in size and positioned higher on building sites.

It is contemplated that, where architecturally desired, the present apparatus 100 and method may be utilized to produce pour- or spray-foam insulated spandrel-type panels to be used in combination with the present insulated curtain wall backpanels 25. The insulated spandrel panels could be used to further insulate the curtain wall system, and provide further control over temperature and moisture fluctuations with the wall (e.g. in the gap between the spandrel panel and the curtain wall backpan).

Although a few preferred embodiments have been shown and described, it will be appreciated by those skilled in the art that various changes and modifications might be made without departing from the scope of the invention. The terms and expressions in the preceding specification have been used therein as terms of description and not of limitation, and there is no intention in the use of such terms and expressions of excluding equivalents of the features shown and described or portions thereof, it being recognized as the scope of the invention as defined and limited only by the claims that follow.

The embodiments of the invention in which an exclusive property or privilege is claimed are defined as follows:

1. An apparatus for manufacturing unitary insulated wall panels, the apparatus comprising:
    a) bending means configured to form an individual panel from a single sheet of metal, the panel having:
        an enclosed and open-faced cavity comprising four sidewalls and a bottom wall for receiving and containing insulation, the four sidewalls defining four sides around a perimeter of the open-faced cavity of the panel, and
        panel attachment means, formed by the bending means to comprise at least one lateral flange extending from and integral to at least one of the sidewalls, for affixing the panel to a wall, and
    b) insulation application means for applying expandable foam insulation to the open-faced cavity, the application means having an applicator head configured to dispense the foam insulation at a pre-determined rate and pressure, and in a pre-determined pattern, and configured to reduce usage of an excess volume of the foam insulation and to provide a predetermined amount of air within the foam insulation, and
    press means for receiving and pressing the panel while the foam cures, the press means being configured to prevent overflow of foam outside of the panel and to provide a flat finish to an insulation surface.

2. The apparatus of claim 1, wherein the panel attachment means correspond to wall attachment means on a wall, to an adjacent panel or both.

3. The apparatus of claim 1, wherein the foam insulation is a polyurethane foam insulation.

4. The apparatus of claim 3, wherein the polyurethane foam insulation is an open-cell spray foam insulation.

5. The apparatus of claim 1, wherein the applicator head comprises a nozzle.

6. The apparatus of claim 5, wherein the apparatus further comprises press means for receiving and pressing the panel while the foam cures.

7. An apparatus for manufacturing unitary insulated wall panels, the apparatus comprising:
   a) bending means configured to form an individual panel from a single sheet of metal, the panel having:
      an enclosed and open-faced cavity comprising four sidewalls and a bottom wall for receiving and containing insulation, the four sidewalls defining four sides around a perimeter of the open-faced cavity of the panel, and
      panel attachment means, formed by the bending means to comprise at least one lateral flange extending from and integral to at least one of the sidewalls, for affixing the panel to a wall, and
   b) insulation application means for applying expandable foam insulation to the open-faced cavity, the application means having an applicator head configured to dispense the foam insulation at a pre-determined rate and pressure, and in a pre-determined pattern, and configured to reduce usage of an excess volume of the foam insulation and to provide a predetermined amount of air within the foam insulation, and
   an oven for heating the panel before the insulation is applied.

8. The apparatus of claim 7, wherein the oven heats the panel to a temperature of approximately 80-100° F.

9. The apparatus of claim 8, wherein the panel is heated to a temperature of 95° F.

10. The apparatus of claim 1, wherein the panel is manufactured of steel or aluminum.

11. The apparatus of claim 1, wherein the panel is an exterior wall panel or a curtain wall back panel.

12. The apparatus of claim 1, wherein some or all of the apparatus is automated.

13. The apparatus of claim 1, wherein some or all of the apparatus is manually operated.

* * * * *